Figure 1:
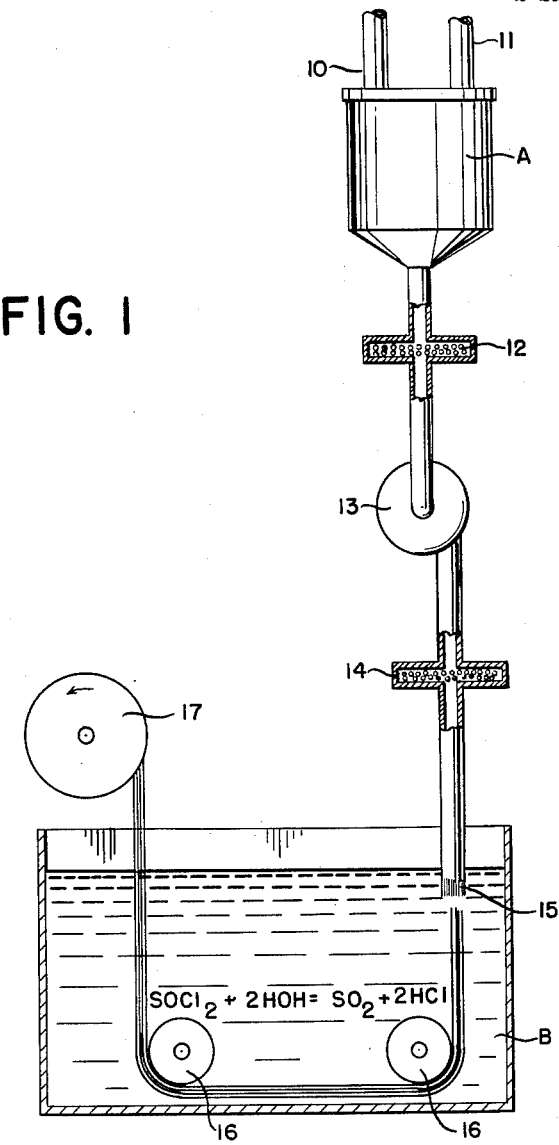

INVENTORS
FELIX SEIDEL
WALTER SINGER
HANS SPRINGER

United States Patent Office 3,067,000
Patented Dec. 4, 1962

3,067,000
PROCESS FOR PRODUCING SHAPED ARTICLES FROM POLYVINYL CHLORIDE
Felix Seidel, Wolfen, Walter Singer, Berlin-Treptow, and Hans Springer, Jessnitz, Germany, assignors to VEB Farbenfabrik Wolfen, Wolfen, Germany
Filed Nov. 8, 1960, Ser. No. 68,024
5 Claims. (Cl. 18—54)

The present invention relates to a process for producing shaped articles from polyvinyl chloride and more particularly from products of polyvinyl chloride which underwent after-chlorination.

It is known to make threads, foils, tubes and similar shaped products from solutions of polyvinyl chloride dissolved in organic solvents. When fibers are to be formed, a dry- or wet-spinning process can be used. Solutions from which the spinning is to be performed should be highly concentrated, clear, and non-gelling.

One solvent very much in use among other organic solvents is acetone, however, the solvents hitherto in use are in so far unsatisfactory, as they dissolve only polyvinyl chrolide or the after-chlorination products thereof having a chlorine content up to 65%. They are not suitable for such after-chlorination products which have a chlorine content from 65 to 75%, since they do not have the capacity to dissolve these products properly.

On the other hand, experience has shown that polyvinyl chloride fibers with 65–67% chlorine as they are currently made, will exhibit a shrinkage in length of from 50 to 60% when boiled in laundering, and consequently knitted material or fabric made from such fibers would exhibit, on boiling, such a shrinkage or deformation, that it would amount to destruction.

The high tendency to shrinkage is decreased, when the polyvinyl chloride is after-chlorinated to about 68% Cl-content; such material hardly shows any tendency to shrinkage in boiling water and material with a still larger Cl-content remains entirely unchanged. Therefore, it has been suggested to increase the Cl-content of finished polyvinyl chloride threads by after-chlorination thereby making it shrink-proof.

It is the object of the present invention to improve the fastness to shrinkage of polyvinyl chloride threads, foils, and the like, when undergoing a boiling in water, without resorting to after-chlorination of the finished products.

This object is accomplished according to the present invention by choosing thionyl chloride as a dissolving agent for the polyvinyl material. We have discovered that either dry polyvinyl chloride powder as such, or a polyvinyl chloride material which was chlorinated to about 75% Cl-content in the course of its production, readily dissolves in thionyl chloride even at room temperature, forming clear solutions therein, and that from solutions thus formed, shaped articles, e.g. foils and fibers, may be made either by the principle of evaporation or by precipitation.

For fiber production the dry-spinning process can be used or, even more advantageously, wet-spinning can be applied with water as a precipitating agent.

The low price of thionyl chloride and its high dissolving capacity for the polyvinyl chloride materials make this process according to the invention highly economical.

The dry-spinning process could, of course, likewise be used with good results, the recovery of thionyl chloride in this embodiment of the invention being readily achieved due to the low boiling point of the compound (B.P. of thionyl chloride=69.5° C. at 760 mm. pressure.)

In the following, the invention will be more fully described in a number of examples, which are given by way of illustration and not of limitation. All percentage figures refer to percent by weight.

EXAMPLE I

*Preparation of After-Chlorinated Polyvinyl Chloride*

Polyvinyl chloride in powder form obtained by any known method is further chlorinated until the desired chlorine content is obtained.

The procedure may be carried out as follows:

In a revolving tube of glass having a diameter of 55 mm. and a length of 1100 mm., 3 ml. chlorine are introduced per second while the tube is rotating at 3 revolutions per minute. The tube is filled with 1 kg. of dry polymerized vinyl chloride and maintained for 17.5 hours at 25° C., chlorination being carried out while the tube is under the action of ultra-violet light. Without any noticeable outward change, the chlorine content has risen from about 54% to approximately 64%. Thus, after chlorination was completed, measurements at the inlet showed chlorine values of 64.65% and 64.31%, at the exit chlorine and hydrochloric acid, respectively: 65.38 and 65.20. If, for the same test, the temperature was made to rise to 75–80° C., chlorine at the inlet was measured at 66.73 and 66.75 and at the exit, chlorine and HCl at 66.98 and 67.35.

The powder is then dissolved in an amount of thionyl chloride which yields a clear solution of 30%.

In the following, the process of wet-spinning the polyvinyl chloride is illustrated in a flow sheet shown in FIG. 1 and described with reference thereto, while the dry spinning process is described with reference to a flow sheet shown in FIG. 2.

EXAMPLE II

*Wet-Spinning Process*

The 30% thionyl chloride solution of after-chlorinated polyvinyl chloride obtained as described in Example I, is passed through a pipe line 10 to a vessel A. The vessel is sealed against moisture by a tube 11 filled with calcium chloride. From the vessel A the solution passes over a glass frit or filter 12 and is entered by pump action of a pumping device 13, after having passed another filtering device 14, through spinning nozzles 15 into a tank B filled with water. Precipitation occurs from the solution, the reaction taking place being as follows:

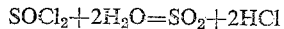

$$SOCl_2 + 2H_2O = SO_2 + 2HCl$$

$SO_2$ and HCl are dissolved in the water and threads formed by the precipitation are passed over guide rolls 16 and wound on spools 17.

EXAMPLE III

Figure 2:
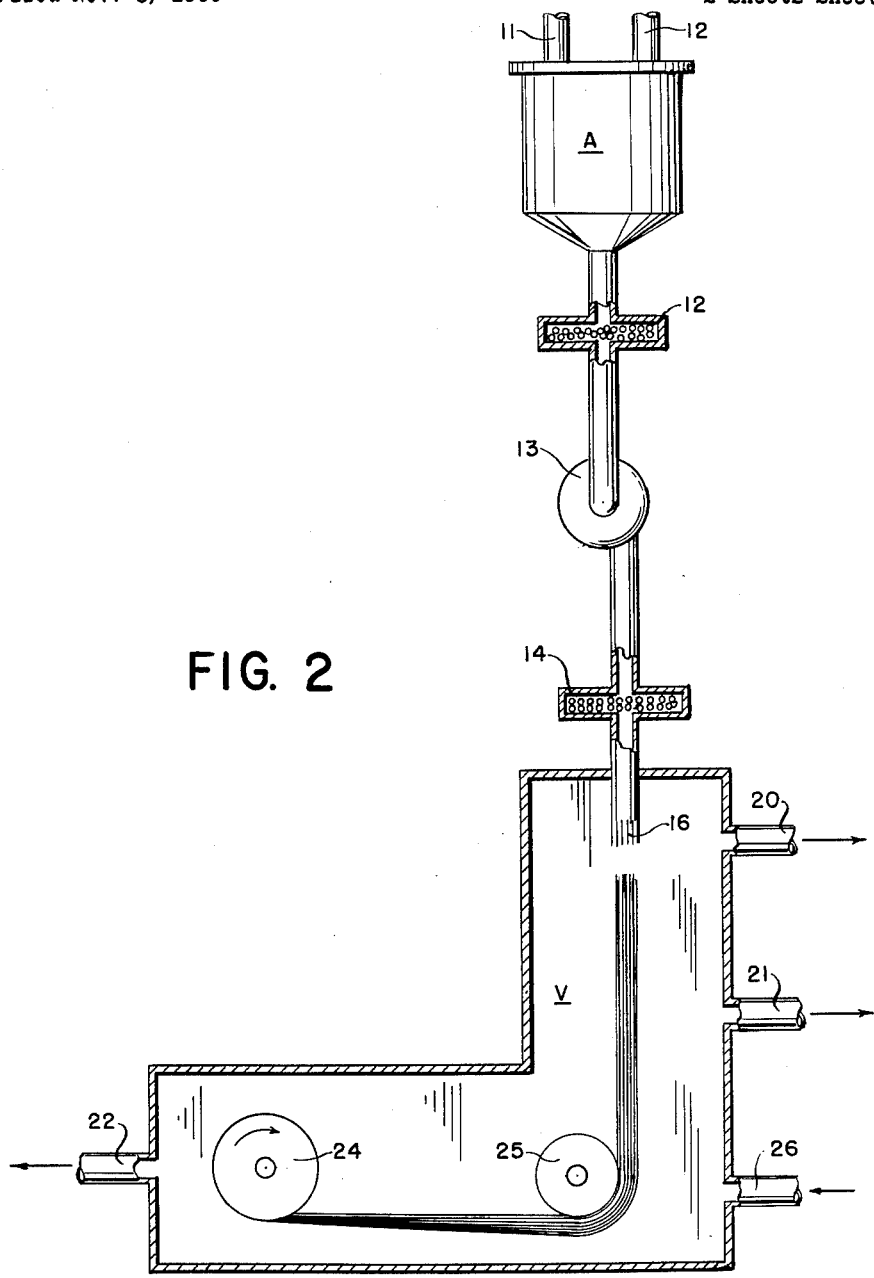

An after-chlorinated polyvinyl chloride material obtained as described in Example I, is further processed by a dry-spinning process, illustrated in FIG. 2. Again the thionyl chloride solution is passed through line 10 to the vessel A, which is sealed against moisture by tube 11. The glass frits 12 and 14 and the pumping device 13 are similar to those described in Example I. After having passed through the glass frits, the material is extruded through nozzles 15 into a vacuum vessel V, equipped with attachment pipes 20, 21 and 22 which connect the vessel V to powerful vacuum sources. The vapors of solvent are thus sucked off and the threads are formed in the manner known, and wound on spools 24. 25 is a guide roller, 26 an inlet for inert gas.

As a rule, the polyvinyl chloride is obtained from monomeric vinyl chloride in powder form. The after-chlorination likewise yields a product in form of a powder which is subjected to further processing as above described. However, it is sometimes desirable to carry out the after-chlorination in a solution and to eliminate from the solution chlorine or hydrochloric gas still present therein, and to subject the after-chlorinated polyvinyl chloride remaining in the solution for further processing, e.g. for the preparation of varnishes, threads, foils, sheets and the like.

In the specific examples the production of threads has been described as an illustration of the processing of after-chlorinated polyvinyl chloride material. However, in a similar manner and by methods known per se, other shaped products may be formed, such as sheets, tubes or hoses of high resistance to shrinkage when exposed, for instance, to hot gases or hot liquids.

What is claimed is:

1. A process for producing polyvinyl chloride in shaped form which comprises dissolving polyvinyl chloride material with a chlorine content from 65–75% by weight in thionyl chloride so as to form a clear solution therein and subjecting the solution to a shaping process, whereupon the thionyl chloride is eliminated from the solution leaving the article in shaped form.

2. The process as claimed in claim 1, wherein the polyvinyl chloride having a chlorine content above about 65% is obtained by after-chlorination of polyvinyl chloride having a lower chlorine content.

3. The process as claimed in claim 1, wherein polyvinyl chloride in powder form is dissolved in thionyl chloride so as to form a 30% solution therein.

4. A process for producing heat resistant, shrinkage-proof threads from polyvinyl chloride having a chlorine content from about 65% to about 75% by weight which comprises dissolving the polyvinyl material in thionyl chloride to form a clear solution therein, extruding the material through spinning nozzles into an aqueous bath liquid, wherein the threads become precipitated and the thionyl chloride is dissociated to $SO_2$ and $HCl$, which dissolve in the aqueous bath liquid, and withdrawing the threads from the bath while they are in stretched condition.

5. A process for producing heat resistant shrinkage-proof threads from polyvinyl chloride having a chlorine content from about 65 to about 75% by weight which comprises dissolving the polyvinyl chloride material in thionyl chloride to form a clear solution therein, extruding the solution through spinning nozzles into an evacuated space, withdrawing the solvent from the solution forming threads thereby, and withdrawing the threads from the evacuated space while they are in stretched condition.

References Cited in the file of this patent

UNITED STATES PATENTS

| | | |
|---|---|---|
| 2,020,642 | Hagedorn | Nov. 12, 1935 |
| 2,181,481 | Gray | Nov. 28, 1939 |
| 2,190,265 | Hubert et al. | Feb. 13, 1940 |